(No Model.)　　　　　　A. I. JACOBS.　　　2 Sheets—Sheet 1.
WIRE SPOKE WHEEL.

No. 596,067.　　　　　　　　Patented Dec. 28, 1897.

Witnesses:
E. J. Hyde.
Andrew Ferguson.

Inventor,
Arthur I. Jacobs,
by Harry R. Williams,
Atty.

(No Model.) 2 Sheets—Sheet 2.

A. I. JACOBS.
WIRE SPOKE WHEEL.

No. 596,067. Patented Dec. 28, 1897.

Witnesses:
E. J. Hyde.
Andrew Ferguson

Inventor,
Arthur I. Jacobs,
by Harry R. Williams,
Atty.

UNITED STATES PATENT OFFICE.

ARTHUR I. JACOBS, OF HARTFORD, CONNECTICUT.

WIRE-SPOKE WHEEL.

SPECIFICATION forming part of Letters Patent No. 596,067, dated December 28, 1897.

Application filed December 14, 1896. Serial No. 615,547. (No model.)

*To all whom it may concern:*

Be it known that I, ARTHUR I. JACOBS, a citizen of the United States, residing at Hartford, in the county of Hartford and State of Connecticut, have invented certain new and useful Improvements in Wire-Spoke Wheels, of which the following is a specification.

The invention relates to the construction and mode of connection of the hub and spokss of a wire-spoke wheel of that class more particularly designed and used for bicycles and light vehicles.

The object of the invention is to provide an inexpensive wheel of this nature having a neat and attractive hub and very simple and strong connections between the ends of the spokes and the hub made in such way that the spokes can be easily and quickly assembled or disassembled when desired by any one.

A wheel embodying the invention has a hub with recesses arranged to loosely receive and hold the heads of the spokes in such manner that the ordinary tension and strains to which the spokes are subjected when connected with the rim prevent the removal of the heads of the spokes from the recesses in the hub, as more particularly hereinafter described, and pointed out in the claims.

Figure 1:
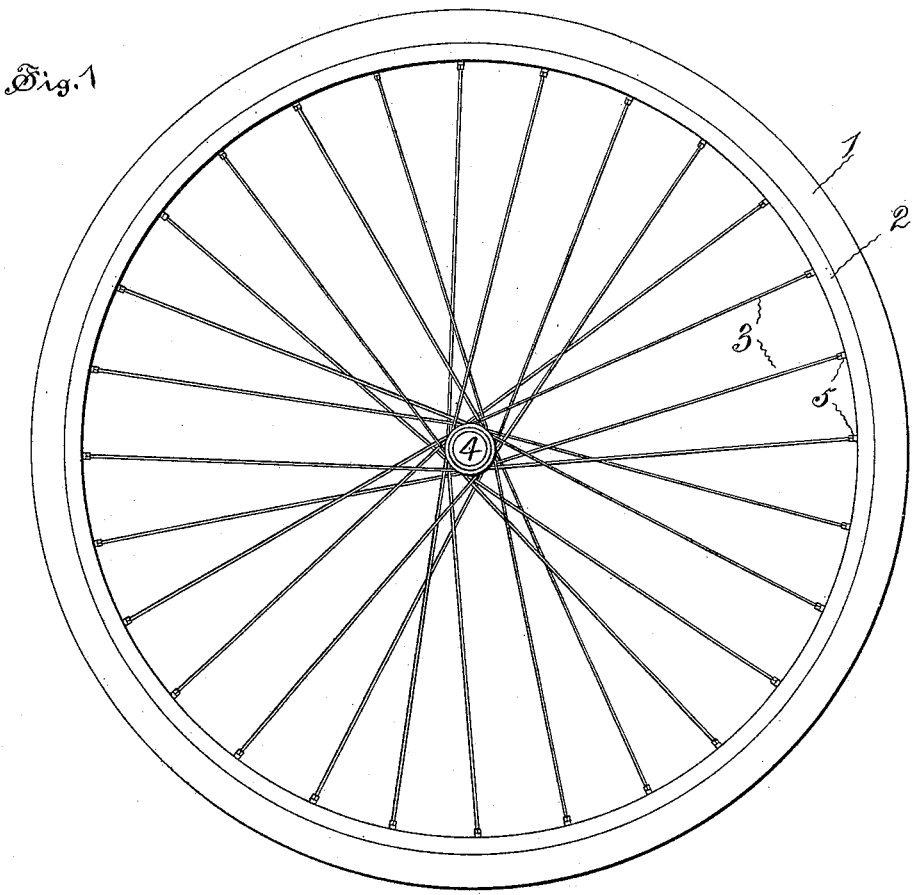
Figure 6:
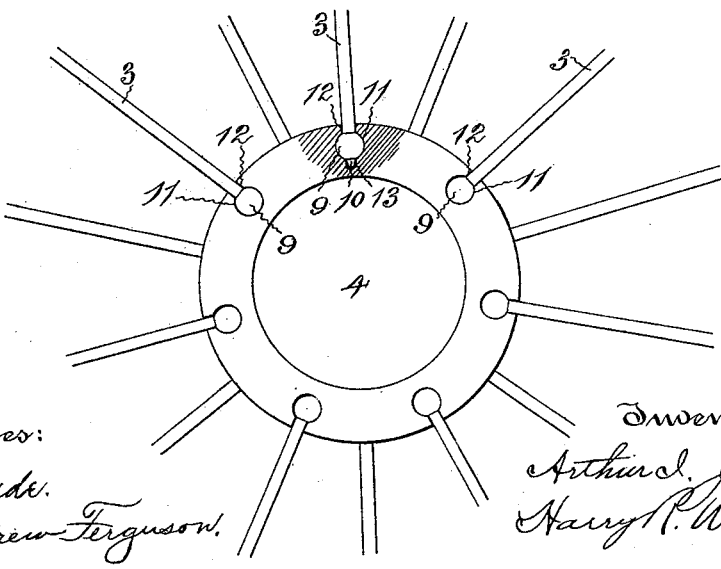
Figure 2:
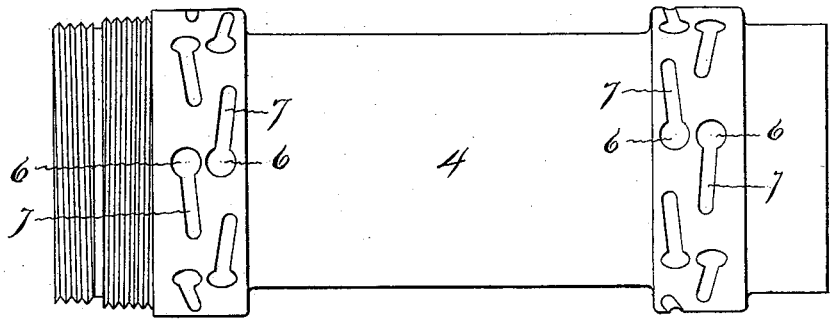
Figure 5:
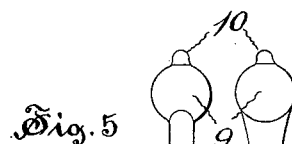
Figure 3:
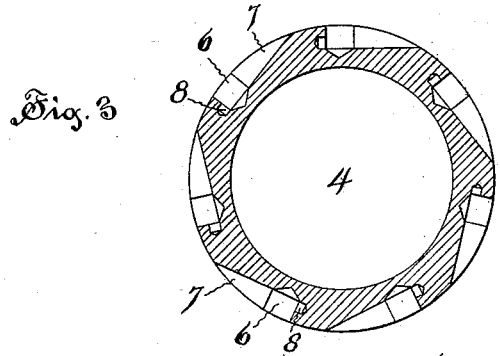
Figure 4:
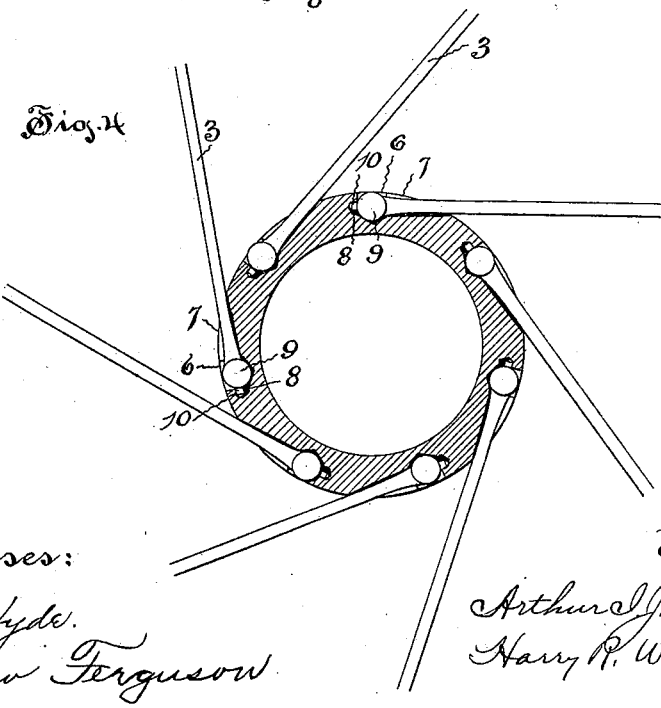

Referring to the accompanying drawings, Figure 1 is a side view of a wheel which embodies the invention. Fig. 2 is an enlarged view of the hub of this wheel. Fig. 3 is a transverse section of the hub, taken on a plane passing through one of the sets of spoke-recesses. Fig. 4 is a similar sectional view of the hub with the heads of the spokes held in the recesses. Fig. 5 shows greatly-enlarged views of the end of one of the spokes, and Fig. 6 is an end view of a hub with a part broken away to illustrate a modification of the invention.

The wheel shown in the views has a common tire 1, ordinary rim 2, wire spokes 3, and tubular hub 4. The spokes are shown as connected with the rim by the usual nipples 5, and they are connected with the hub after the manner of the present invention.

The spokes can of course be arranged to extend either tangentially or radially from the hub to the rim. When the connections are to be made so that the spokes extend tangentially, sockets 6 are formed around the hub near each end. These sockets are preferably made by drilling substantially radially into the material of the hub or a collar secured to the hub, and two rows of these sockets are made around the hub near each end. Grooves 7 are made in the periphery of the hub to each of these sockets. These grooves are narrower in width than the diameter of the sockets and are preferably formed by milling away substantially tangentially a portion of the periphery of the hub adjacent to each of the sockets. The milling cuts are made obliquely to the longitudinal plane of the hub, so that the spokes can extend from near the ends of the hub into a single plane at the rim, as do the spokes of the ordinary wheels of this class, and the grooves are made in opposite directions to the adjacent sockets, so that the spokes may extend through the same tangentially to diametrically opposite sides of the rim, as is common with tangential-spoke wheels.

Small chambers 8 are preferably made in the walls of the radial sockets, and these are usually formed by drilling substantially tangentially in line with the grooves 7.

The spokes are formed in the ordinary manner from the customary material and are provided with enlarged heads 9. The head may be formed by swaging or squeezing the metal of the spoke, and it is substantially spherical. Ordinarily there is a protuberance or knob 10 formed on the head substantially in line with the axis of the spoke, so that the diameter of the head along the axis of the spoke is somewhat longer than the diameter at right angles to the axis of the spoke, and the body of the spoke, which is substantially round, near the head is usually flattened or made oblong in cross-section, so that it may have one diameter longer than another.

In assembling this form of wheel each enlarged head is thrust into a socket 6 substantially radially, and then the spoke is turned to a tangential position; the tangential groove 7 receiving the shank of the spoke near the head and the chamber 8 receiving the protuberance 10. When the outer threaded end of the spoke in this position is engaged by its nipple in the rim and is drawn tight, the head cannot be disengaged from the hub, for the reason that the strain on the spoke toward the rim cannot pull the enlarged head tangentially from the radial socket which it fits through the smaller tangential groove 7, in which the smaller shank of the spoke rests, and the protuberance 10 in the chamber 8 prevents the enlarged head from lifting radially out of the socket 6. As the spokes are flattened near the heads they cannot turn in the grooves 7 when the nipples are being screwed on or off.

When it is desired that the spokes shall extend radially from the hub to the rim, after the manner illustrated in Fig. 6, sockets 11 are drilled longitudinally into the hub or a collar adapted to be screwed upon the hub, and grooves 12 are milled from the periphery radially to these sockets on one face of the end of the hub or collar. The small chambers 13 are drilled radially by drilling through the radial grooves. To assemble a wheel with the recesses formed in this manner, the heads are thrust into the sockets 11 substantially longitudinally with the hub, and the spokes are then turned into the radial position, the bodies of the spokes near the heads lying in the radial grooves 12 and the protuberances projecting into the chambers 13. In this case the protuberances in the small chambers retain the heads of the spokes in the sockets, so that the enlarged heads cannot be pulled through the smaller radial grooves when the nipples are tightened and the wheel is subjected to the strains incident to use.

A wheel embodying this invention is inexpensive to manufacture, for the spokes can be formed by ordinary tools, and the recesses in the hub can be made in a simple manner, and this wheel can be easily and quickly assembled, for the heads of the spokes are readily inserted into the recesses and turned, so that when the nipples are screwed up the heads cannot be removed. Such a wheel is neat and attractive in appearance on account of the simplicity of its construction and because the periphery of the hub when the spokes are in position is free from projecting nipples or unsightly flanges and is substantially smooth, so that it can be nicely cleaned. This wheel can be made as strong as any of this class of wheels and slightly less in weight, and when a spoke is bent or damaged such a spoke can be quickly taken out by any one and a new one inserted.

I claim as my invention—

1. In a wheel of the within-described class, in combination, a hub having sockets that extend inwardly from the periphery and having grooves that extend along the periphery from the sockets, and spokes having enlarged heads that fit and fill the sockets and having shanks that lie in and fill the grooves, as specified.

2. In a wheel of the within-described class, in combination, a hub having sockets that extend substantially radially inward from the periphery and having grooves that extend substantially tangentially along the periphery from the sockets, and spokes having substantially globular heads that fit and substantially fill the sockets and having shanks that lie in and substantially fill the grooves, as specified.

3. In a wheel of the within-described class, in combination, a hub having sockets with openings of smaller size from the sockets to the periphery of the hub and with chambers in the walls of the sockets, and spokes having heads that substantially fill the sockets and are held against movement longitudinally of the spokes by the walls of the sockets, with protuberances from the heads entering the chambers and holding the heads against movement transversely of the spokes, and with shanks that extend through and substantially fill the openings from the sockets, as specified.

4. In a wheel of the within-described class, in combination, a hub having sockets that extend substantially radially inward from the periphery with chambers extending substantially tangentially from the walls of the sockets and with grooves that extend substantially tangentially along the periphery of the hub from the sockets, and spokes having heads that fit and substantially fill the sockets and are held against movement longitudinally of the spokes by the walls of the sockets with protuberances from the heads entering the chambers and holding the heads against movement transversely of the spokes and with shanks that substantially fill and extend through the grooves, as specified.

5. A spoke for a wheel of the within-described class having a substantially cylindrical body, a shank without bend, a head at the end of the shank and a protuberance projecting from the head, substantially as specified.

6. In a wheel of the within-described class, a hub having sockets that extend substantially radially inward from the periphery and having grooves that extend substantially tangentially along the periphery from the sockets, as specified.

7. In a wheel of the within-described class, in combination, a hub having sockets that extend inwardly from the periphery and having grooves that extend along the periphery from the sockets, and spokes having enlarged heads that fit and substantially fill the sockets and having shanks of oblong cross-section without bend that lie in and substantially fill the grooves, as specified.

ARTHUR I. JACOBS.

Witnesses:
HARRY R. WILLIAMS,
E. J. HYDE.